United States Patent [19]
Diemer et al.

[11] 4,121,085
[45] Oct. 17, 1978

[54] GAS NOZZLE FOR LASER WELDING

[75] Inventors: Donald P. Diemer; Joseph C. Hafele; Robert H. Hawkins, all of Peoria; Gerald P. Simmons, Washington, all of Ill.

[73] Assignee: Caterpillar Tractor Co., Peoria, Ill.

[21] Appl. No.: 684,229

[22] Filed: May 7, 1976

[51] Int. Cl.² ............................................. B23K 27/00
[52] U.S. Cl. ............................... 219/121 L; 239/119; 350/63; 350/97; 350/288
[58] Field of Search ..................... 219/121 L, 121 LM; 239/119; 350/63, 66, 5, 97, 288, 293; 128/21, 303.1; 331/94.5 T

[56] References Cited
U.S. PATENT DOCUMENTS

| | | | |
|---|---|---|---|
| 3,696,230 | 10/1972 | Friedrich | 350/63 X |
| 3,742,182 | 6/1973 | Saunders | 219/121 LM |
| 3,907,408 | 9/1975 | Engel | 350/294 |
| 3,949,878 | 7/1973 | Sullivan | 219/121 L |
| 3,986,767 | 10/1976 | Rexer et al. | 350/63 X |
| 4,010,345 | 3/1977 | Banas et al. | 219/121 L |

*Primary Examiner*—J. V. Truhe
*Assistant Examiner*—M. Paschall
*Attorney, Agent, or Firm*—Phillips, Moore, Weisenberger, Lempio & Majestic, Strabala

[57] ABSTRACT

A laser system includes a nozzle assembly for use in directing a shielding gas around a laser beam and thereby protecting the point of focus from contamination by the atmosphere as is useful in welding and cutting applications. The nozzle includes a manifold section for admitting a shielding gas such as inert gas through a diffuser formed therein which exits from an outlet aperture through a nozzle tip section. The geometry of the nozzle is such that a certain amount of the shielding gas is flowed backward through an inlet aperture in the manifold section and thence into a housing container reflecting mirrors for directing and focusing the laser beam through the nozzle assembly. The remaining shielding gas, which is the bulk of the gas admitted, passes out through the outlet aperture in column fashion around the laser beam. By producing a back flow of shielding gas, aspiration of air through the housing and onto the workpiece is avoided. In addition, the necessity of having alternative means for preventing such aspiration in the form of windows or lenses closing off access to the housing is also prevented. The nozzle assembly is in two parts to facilitate interchanging of nozzle tips with the manifold, thereby providing a range of outlet opening sizes.

8 Claims, 4 Drawing Figures

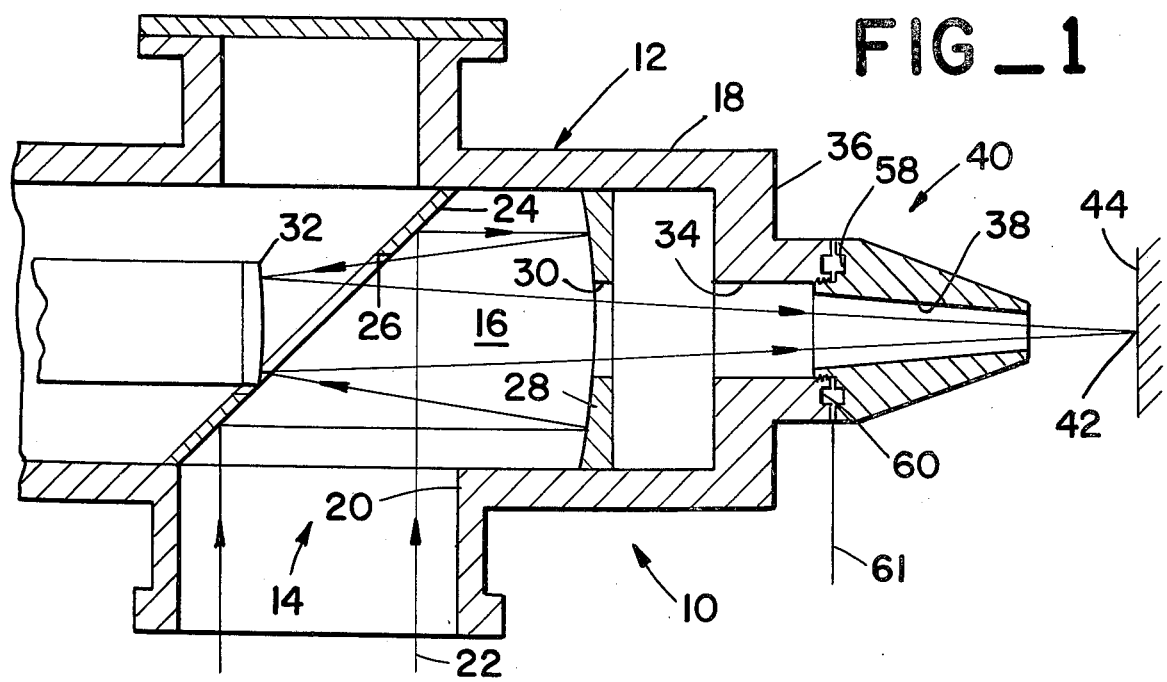
FIG_1
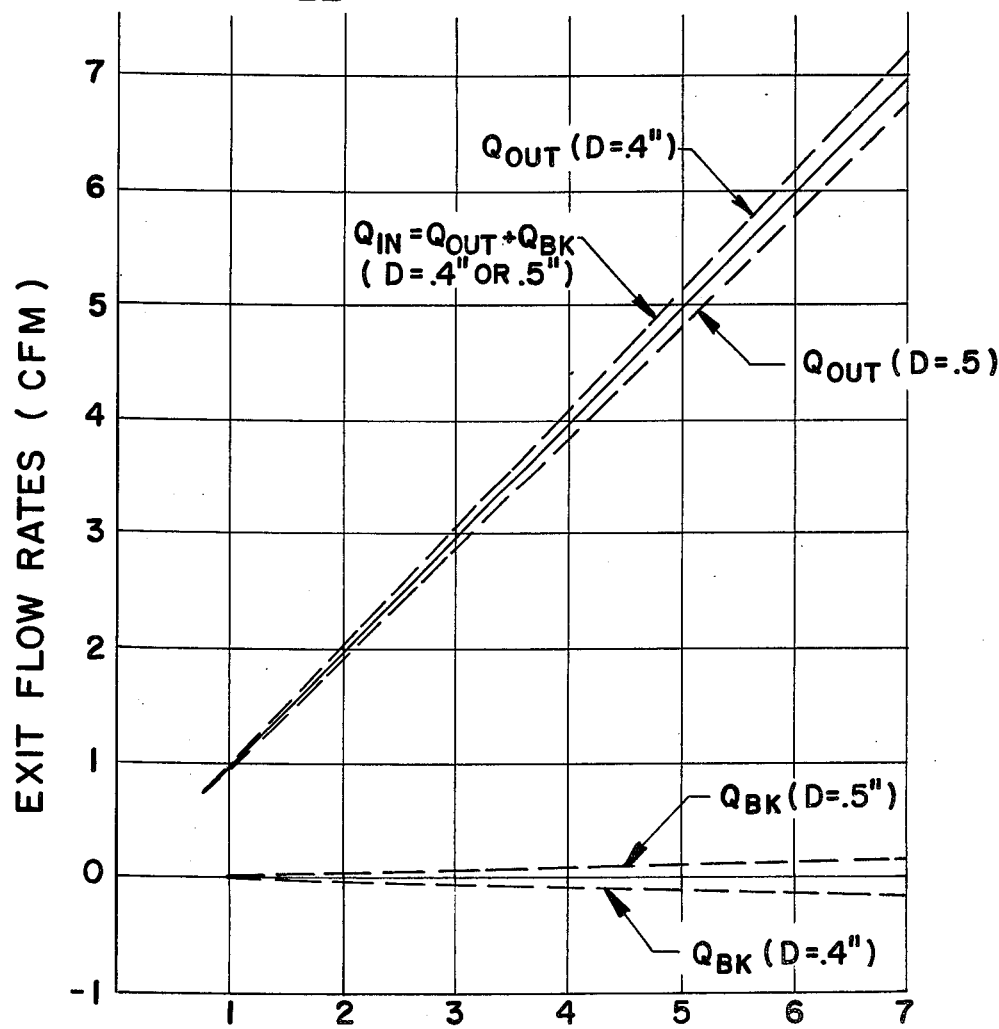
FIG_4

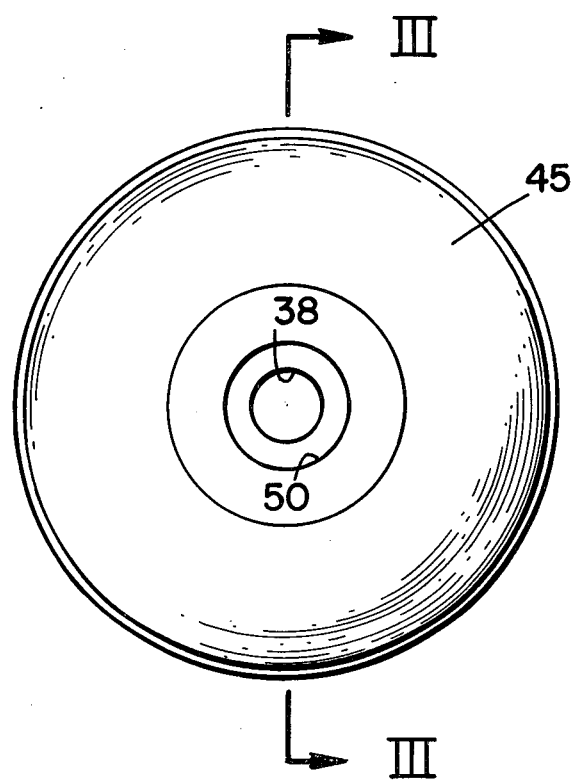
FIG_2
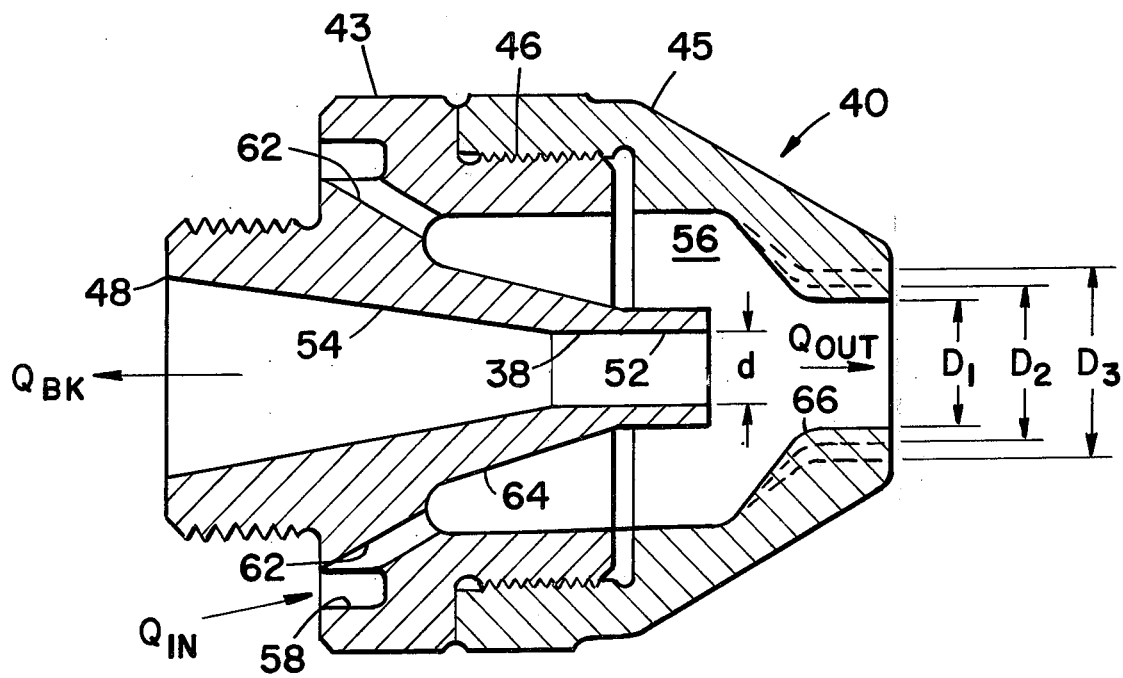
FIG_3

GAS NOZZLE FOR LASER WELDING

BACKGROUND OF THE INVENTION

This invention relates to a laser system including a nozzle for introducing a flow of shielding gas around an exiting laser beam. More particularly, this invention concerns such a nozzle having a means for backflowing a small amount of the incoming gas into a housing containing the laser mirror system.

Currently, lasers are being applied to manufacturing operations where they are used for thermal cutting and gouging as well as welding of metals. Lasers have been found to be especially useful in such applications and their use is increasing. Frequently it is desirable to shield the weld on a workpiece from the atmosphere by, e.g. providing a concentric column of shielding gas about the laser beam. This is accomplished most conveniently by utilizing a nozzle at the point where the focused laser beam exits from the housing of the laser system containing the reflecting mirrors.

A number of prior art systems are apparent which provide for the introduction of a gas through a manifold and into a laser nozzle and thence about a laser beam. Examples of these prior art attempts are shown in U.S. Pat. Nos. 3,569,660 to Holdcroft; 3,597,578 to Sullivan; and 3,696,230 to Friedrich. With these prior art systems, however, the shielding gas is prevented from moving backward into the laser system housing containing the focusing and concentrating mirrors by means of a window placed across the inlet to the nozzle. Additional sealing off of gas flow from the nozzle to the housing chamber is usually found in the form of an additional lens adjacent the mirror.

One problem engendered by having such a window is that, while initially clear, it tends to become obscured by contaminants during use. This results in a diminishing of the laser beam energy that can pass therethrough and subsequently through the nozzle and onto the workpiece. This, of course, results in a degradation in the output of the laser as seen by the workpiece. While some attempts have been made to direct the shielding gas onto the window to scour and clean it, this is not completely satisfactory, and the window must be periodically removed and replaced.

One way of avoiding this problem is to provide a laser system wherein the optical system includes a housing absent any window. One such system is shown in U.S. Pat. No. 3,907,408 to Engel, assigned to the Assignee hereof. With this type of system, there is full intercommunication between the interior of the laser optical system housing containing the mirrors and the interior of the nozzle. Without the window, the flow of shielding gas through the conventional laser nozzle and onto the workpiece causes an aspiration of gas to occur from the interior of the housing into the nozzle and thence onto the workpiece. If the housing is open to atmosphere, this results in an undesirable inclusion of atmospheric air with the shielding gas wherein it combines within the nozzle and is passed out onto the workpiece. This, of course, can result in poor-quality welds as the atmospheric air contacts the weld zone.

SUMMARY AND OBJECTS OF THE INVENTION

The present invention includes an improved laser nozzle which produces a backflow of a small amount of the incoming shielding gas counter to the direction of the laser beam, while at the same time producing a forward flow in the same direction of the laser beam for shielding purposes. The nozzle includes a manifold section having a diffuser portion for diffusing incoming shielding gas into a chamber formed in the nozzle with the nozzle tip portion. A small amount of gas flows backward through a central aperture and into the laser optical system housing. In this manner aspiration of atmospheric air from the housing into the nozzle is effectively prevented. The remainder of the gas that is introduced into the nozzle is exited therefrom in columnar fashion around the laser beam through a nozzle outlet aperture. The central aperture, represented by diameter "$d$" is less than diameter "$D$" of the outlet opening or aperture. A plurality of manifold apertures for admitting shielding gas to the diffuser are provided. Such apertures are arranged in spaced relation around the nozzle. The flow relations between the shielding gas inlet to the nozzle and that exited in a forward direction through the outlet and in a backward direction through the inlet is according to the equation:

$$Q_{in} = Q_{bk} + Q_{out}$$

Where $Q_{in}$ = the flow rate of gas into the manifold $Q_{out}$ = the flow rate of gas out of the nozzle and onto the workpiece in a forward direction $Q_{bk}$ = the flow of gas in the backward or direction counter to the laser beam and out of the central aperture.

Tests were conducted to ascertain the proper dimensional relationships in the nozzle to achieve backflow through the central aperture and therefore to prevent aspiration. A welding nozzle was constructed incorporating a diffuser section surrounding a manifold inlet having a central aperture diameter ($d$) opening of 0.25 inch sufficient to pass a converged laser beam. The outlet of the nozzle was contained in an interchangeable nozzle tip in which the exit diameter (D) was varied downward in 0.1 inch increments from 0.6 inch to 0.4 inch. The backflow was found not to occur until the 0.4 inch diameter outlet was used. Backflow was found to be most sensitive to the size of the exit diameter D. In addition, in a nozzle having eighteen 0.094 inch diameter inlet holes in equally spaced relationship around the diffuser of the manifold, backflow could be obtained in the ratio of the area of the outlet ($A_{out}$) to the area of the inlet ($A_{in}$) was about 0.99. In other words, the ratio of the areas would be expressed as follows:

$$A_{out} \leq 0.99 \, A_{in}$$

By making the nozzle in two portions, a manifold and a tip portion, and having a screw-threaded connection therebetween, the interchanging of tips with various diameters is facilitated. This is also advantageous in use, inasmuch as tips may be destroyed incident to welding, and if interchangeable only the tip portion need be replaced. This gives a savings in cost and time.

It is therefore the primary object of this invention to provide an improved laser system having a nozzle providing for backflow of shielding gas, thereby eliminating the necessity of a window.

It is a further object of this invention to provide such a system having a nozzle assembly providing for positive backflow of shielding gas, thereby preventing aspiration of air through a non-pressurized laser focusing device.

It is a further object of this invention to provide such a system having a nozzle of two-piece construction, wherein a tip portion may be removed to facilitate replacing with different sized exit opening tips, thereby permitting selected shielding column and secondary air flow rates.

Further and other objects and advantages of this invention will become more readily apparent from a review of the following description and accompanying drawings.

BRIEF DESCRIPTION OF THE DRAWINGS

FIG. 1 is a partial elevational semi-cross-sectional, semi-schematic view of the laser system of the instant invention, illustrating the arrangement of components;

FIG. 2 is a front elevation view of a nozzle of the instant invention;

FIG. 3 is a side elevation, cross-sectional view taken along lines III—III in FIG. 2 of the nozzle showing details thereof; and, FIG. 4 is a graphical illustration of the operation of the nozzle.

DETAILED DESCRIPTION

Turning to FIG. 1, there is shown in semi-schematic form generally at 10 a laser system comprising a housing 12 for containing an optical system 14 in a chamber 16 formed therein. The construction of such optical system may be more readily seen in U.S. Pat. No. 3,907,408 to Engle, assigned to the Assignee hereof, and such patent and the disclosure thereof is hereby expressly incorporated by reference. It is sufficient to say that the housing 12 is of generally tubular construction having a longitudinally directed cylindrical sidewall 18 having a first aperture 20 contained in the side thereof for admitting a columnar laser beam as at 22. The laser beam is reflected off a planar angled mirror 24 having a centrally disposed aperture 26 therein. The beam is then reflected onto a concave reflective mirror 28 having a centrally disposed aperture 30 therein. The beam then is converged and reflected off a convex mirror 32 from whence it passes through aperture 30 and centrally disposed aperture 34 in forward wall 36, closing the forward end of housing 12 and thence through a bore or passage 38 in nozzle assembly 40. The beam converges to a point 42 on a workpiece 44 in order to effect welding or some other desired operation.

With particular reference to FIGS. 2 and 3, the details of construction of the inventive nozzle are more readily seen. As shown in these figures, the nozzle comprises an assembly of the manifold 43 which is removably joined to a tip 45. As may be readily seen, the nozzle is elongated and symmetric about a central axis coincident with through passage 38. The manifold and tip are readily disengageable by means of relative rotation of the tube part so as to separate their threaded connection 46. In this manner, different tips may be readily interchanged with the manifold.

As may be seen, the nozzle includes a laser beam inlet 48 and an outlet 50 at opposite ends thereof. The inlet is joined to a cylindrical aperture 52 of a diameter $d$ by means of a frustoconical transition portion 54. The aperture 52 extends into a nozzle chamber 56 formed within nozzle 40. Nozzle outlet 50 is an aperture having a diameter D which may be varied by interchanging tips as shown by $D_1$, $D_2$, and $D_3$.

Shielding gas at a flow rate $Q_{in}$ enters the nozzle through an annular manifold chamber 58 of correspondingly shaped chamber 60 and forward wall 36 of housing 12 as best seen in FIG. 1. The shielding gas enters the manifold chamber from a source of supply (not shown) by way of an inlet line 61. Returning to FIG. 3, the gas is then intercommunicated with chamber 56 by means of a plurality of equally spaced manifold inlet apertures 62 arranged around the nozzle and by a diffuser portion 64 formed in the manifold. The diffuser portion allows the gas entering through inlet apertures 62 to diffuse into chamber 56 and pass around a smoothly curved transition portion 66 at the outlet 50. As may be appreciated by the arrow indication, a major portion of the inlet flow $Q_{in}$ exits through outlet 50 as $Q_{out}$, a certain portion of the flow $Q_{bk}$ exits through inlet 48 contra to the direction of the laser beam. In this manner aspiration is avoided.

A series of tests were conducted with the aperture diameter $d$ equal to 0.25 inch and an outlet diameter D equal to 0.6 through 0.4 inch in 0.1 inch increments, as aforementioned. FIG. 4 shows a plot generated from a series of data points for various inlet flow rates for the D = 0.4 and 0.5 inch cases. It was found that a critical dimension of D = 0.4 occurred inasmuch as no backflow was accomplished with the D = 0.6 or D = 0.5 cases. On the other hand, backflow was accomplished when the diameter D was set to 0.4 inch.

More particularly, the graph of FIG. 4 shows that for the same $Q_{in}$, a backflow occurred with the D = 0.4 inch case, whereas a negative backflow or aspiration occurred with a D = 0.5 inch case. It is theorized that backflow will occur with D equal to less than 0.4 inch as well. With these tests, the nozzle was provided with eighteen 0.094 diameter inlet apertures. The ratio of area of the outlet to the aggregate area of the inlets was in the relationship:

$$A_{out} \leq 0.99 A_{in}$$

Thus, there is provided a laser system which effectively eliminates aspiration in unpressurized housings.

It is to be understood that the foregoing description is merely illustrative of the preferred embodiment of the invention and that the scope of the invention is not to be limited thereto, but is to be determined by the scope of the appended claims.

What is claimed is:

1. A laser system comprising a housing defining a chamber within said housing, mirror means mounted in said chamber in said housing, a first aperture in said housing for receiving a laser beam from a laser beam source, a second aperture in said housing for allowing exiting of said laser beam after it has been reflected by said mirror means, nozzle means defining an inlet and an outlet and a nozzle axis therethrough, said nozzle means being mounted on said housing over said second aperture so that a laser beam passing through second aperture will pass into said inlet and exit from said outlet coaxially with said nozzle axis, said mirror means including a mirror operatively positioned with respect to said nozzle axis, and including a centrally disposed mirror aperture defined therein along said nozzle axis, gas inlet means in said nozzle means for introducing a flow of gas intermediate said inlet and said outlet, said mirror aperture, said second aperture and said nozzle means being unobturated entirely along said nozzle axis so that fluid communication is provided between said chamber and said nozzle means entirely along said nozzle axis, and wherein said nozzle means has means therein for causing a backflow coaxially with said nozzle axis of a portion of the gas introduced into the nozzle back through said inlet, said second aperture, said mirror aperture and into said chamber while simultaneously allowing a portion of the gas to flow forwardly through said outlet also coaxially with said nozzle axis.

2. The invention of claim 1 wherein said nozzle assembly includes a manifold portion including said inlet and a tip portion including said outlet, said manifold portion including a diffuser section for admitting said flow of gas into said chamber as well as an aperture positioned along the nozzle axis and defining a diameter $d$, said aperture permitting backflow of gas therethrough to said inlet, and wherein said outlet defines an exit aperture positioned along the nozzle axis and having a diameter D.

3. The invention of claim 2 wherein the exit aperture diameter D is greater than the manifold diameter $d$.

4. The invention of claim 2 wherein the exit aperture diameter D is approximately 0.4 inch.

5. The invention of claim 4 wherein the aperture diameter $d$ is approximately 0.25 inch.

6. The invention of claim 2 wherein said nozzle manifold portion and said tip portion are discrete manifold and tip parts, and further including means removably securing said manifold to said tip whereby tips may be interchanged with said manifold.

7. The invention of claim 2 wherein said manifold portion includes a plurality of manifold apertures introducing said flow of gas, said manifold apertures defining an aggregate cross-sectional area of $A_{in}$, said exit aperture defining an exit aperture cross-sectional area of $A_{out}$, and wherein said exit aperture area $A_{out}$ is greater than $A_{in}$.

8. The invention of claim 7 wherein said aperture areas are related so that:

$$A_{out} \leq 0.99 \, A_{in}$$

where $A_{out}$ and $A_{in}$ are in units of area.

* * * * *